(12) United States Patent
Henn et al.

(10) Patent No.: US 12,353,936 B1
(45) Date of Patent: Jul. 8, 2025

(54) SMART CARD FOR COMMUNICATION WITH AN EXTERNAL READER

(71) Applicant: AdvanIDe Holdings Pte. Ltd., Singapore (SG)

(72) Inventors: Ralf Henn, Singapore (SG); Joe Lo, Singapore (SG); Holger Roessner, Singapore (SG)

(73) Assignee: ADVANIDE HOLDINGS PTE. LTD., Singapore (SG)

( * ) Notice: Subject to any disclaimer, the term of this patent is extended or adjusted under 35 U.S.C. 154(b) by 0 days.

(21) Appl. No.: 18/680,339

(22) Filed: May 31, 2024

(51) Int. Cl.
  *G06K 19/077* (2006.01)
  *H01Q 1/22* (2006.01)

(52) U.S. Cl.
  CPC ... *G06K 19/0772* (2013.01); *G06K 19/07773* (2013.01); *H01Q 1/2283* (2013.01)

(58) Field of Classification Search
  CPC ............ G06K 19/0772; G06K 19/07773
  USPC ............................................ 235/492
  See application file for complete search history.

(56) References Cited

U.S. PATENT DOCUMENTS

| | | | |
|---|---|---|---|
| 6,378,774 B1 | 4/2002 | Emori et al. | |
| 8,366,009 B2 | 2/2013 | Finn et al. | |
| 8,789,762 B2 | 7/2014 | Finn et al. | |
| 8,870,080 B2 | 10/2014 | Finn | |
| 8,991,712 B2 | 3/2015 | Finn et al. | |
| 9,033,250 B2 | 5/2015 | Finn et al. | |
| 9,165,240 B2 | 10/2015 | Finn et al. | |
| 9,195,932 B2 * | 11/2015 | Finn | H05K 3/103 |
| 9,239,982 B2 * | 1/2016 | Finn | H01Q 1/2283 |
| 9,251,458 B2 | 2/2016 | Finn et al. | |
| 9,272,370 B2 | 3/2016 | Finn et al. | |
| 9,390,366 B1 | 7/2016 | Herslow et al. | |
| 9,449,269 B2 | 9/2016 | Finn et al. | |
| 9,547,814 B2 | 1/2017 | Mosteller | |
| 9,633,304 B2 * | 4/2017 | Finn | H01Q 1/2283 |
| 9,646,242 B2 * | 5/2017 | Hofer | H01Q 9/20 |
| 9,721,200 B2 | 8/2017 | Herslow et al. | |
| 10,043,126 B2 * | 8/2018 | Pachler | G06K 19/07743 |
| 10,445,628 B2 | 10/2019 | Mosteller | |
| 2002/0100810 A1 * | 8/2002 | Amadeo | G06K 19/07749 235/492 |
| 2007/0267506 A1 | 11/2007 | Bashan et al. | |
| 2013/0075477 A1 | 3/2013 | Finn et al. | |

(Continued)

OTHER PUBLICATIONS

European Patent Office, Extended Euroepan Search Report Issued in Application No. 24179158.1, Nov. 15, 2024, Germany, 9 pages.

*Primary Examiner* — Michael G Lee
*Assistant Examiner* — David Tardif
(74) *Attorney, Agent, or Firm* — McCoy Russell LLP

(57) ABSTRACT

Systems and methods are herein provided for a smart card. In one example, a smart card comprises a first coil having turns of wire defining a first interior space within the first surface area surrounded by turns of wire of the first coil; a second coil having turns of wire defining a second interior space within the second surface area surrounded by turns of wire of the second coil; a third coil having turns of wire defining a third interior space within the third surface area surrounded by the wire of the third coil; and a non-metallic substrate of the smart card into which the first, second, and third coils are arranged, the non-metallic substrate being free from conductive and/or metallic foil and conductive and/or metallic layers.

20 Claims, 10 Drawing Sheets

(56) References Cited

U.S. PATENT DOCUMENTS

2014/0104133 A1    4/2014   Finn et al.
2015/0154491 A1    6/2015   Charrat et al.

\* cited by examiner

SMART CARD FOR COMMUNICATION WITH AN EXTERNAL READER

TECHNICAL FIELD

Embodiments of the subject matter disclosed herein relate generally to a smart card, and more particularly to a smart card configured for communication with an external reader.

BACKGROUND AND SUMMARY

Generally, smart cards, also called chip cards, integrated circuit (IC) cards, microchip cards, and electronic cards, are portable devices equipped with embedded integrated circuits that can process and store data securely. These cards utilize contact or contactless methods to communicate with readers, performing functions such as authentication, data storage, and application processing. Commonly used in financial transactions, identity verification, access control, and public transit systems, smart cards provide enhanced security over traditional magnetic stripe cards.

To enable data exchange between an external reader and a smart card, the external reader generates a high frequency magnetic field. This magnetic field induces a current in an antenna coil of the smart card. The antenna coil is connected to a microchip, possibly by inductive coupling. This coupling provides the necessary power to operate the microchip and facilitates transmission of data.

US20130075477 A1 discloses a data carrier such as a smart card comprising an antenna module and a booster antenna. The booster antenna has an outer winding and an inner winding, each of which as an inner end and an outer end. A coupler coil is provided, connecting the outer end of the outer winding and the inner end of the inner winding. The inner end of the outer winding and the outer end of the inner winding are left unconnected. The coupler coil may have a clockwise or counterclockwise sense which is the same as or opposite to the sense of the outer and inner windings. Various configurations of booster antennas are disclosed.

The inventors herein have developed a smart card with features that increase communication performance with external readers. For example, the smart card as herein disclosed may enhance matching between the smart card's antenna system and the external reader antenna via inclusion of an additional passive coil, thus enabling more efficient communication.

The smart card as herein disclosed comprises a coil configuration that allows optimized inductive coupling with external readers. This configuration provides an antenna system in the smart card with three coils, wherein a first coil is connected to a microchip, a second coil is part of an inductor-capacitor (LC) network, which is arranged in an interior space of a third coil and increases matching of the third coil, which acts as an antenna coil, to the resonant frequency of the external reader. In addition, the third coil may be connected to the first coil. Through this design, the smart card achieves a higher sensitivity and more reliable data exchange, allowing for flexibility in use with different applications that demand secure and rapid communication.

The structural design of the smart card as herein disclosed not only enhances communication capabilities, but also ensures that the smart card is robust, thereby maintaining high structural integrity. The arrangement of the coils and the use of durable materials may ensure that the smart card retains its functionality when subjected to physical stresses such as bending or pressure. In addition, this design allows for efficient use of space within the card, facilitating the integration of additional features such as security elements or personalization options, without compromising performance or size.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure is illustrated by way of example and not limited in the accompanying figures in which like reference numerals indicate similar elements. Embodiments of the application will now be described with reference to the attached drawings.

DETAILED DESCRIPTION

The following description relates to systems and methods for a smart card. The smart card as herein described comprises three coils. First, second, and third coils may define individual interior spaces and surface areas, in one or more configurations. The first and/or second coils may be arranged within an interior space of the third coil. The first, second, and third coils may be arranged in a non-metallic substrate, referred to herein as an antenna substrate. The third coil, which may be an antenna coil, may be separate from the second coil, which may be a non-radiating component configured to increase matching of the third coil to an external reader.

Figure 1:
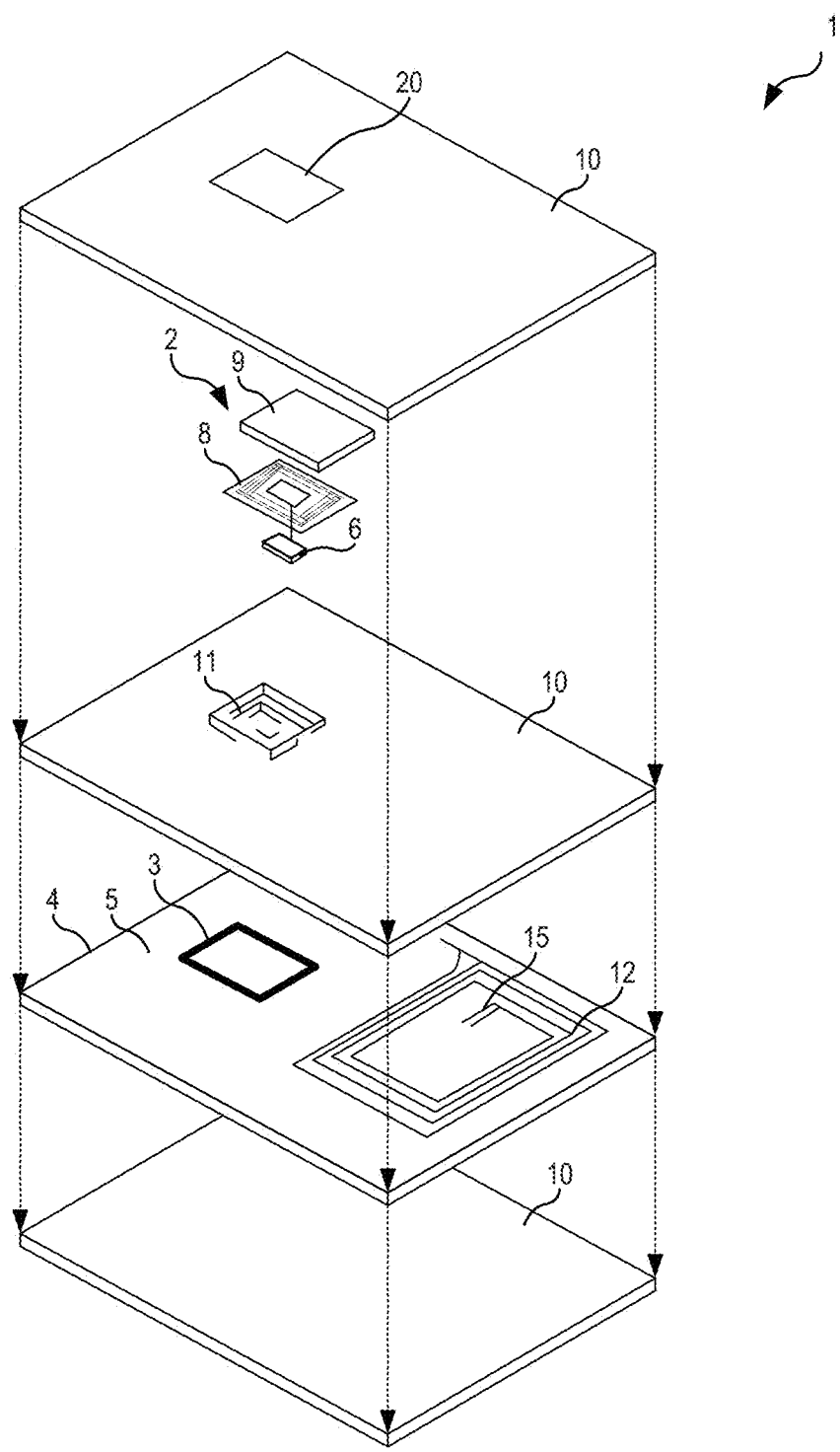
FIG. 1 shows a smart card in an exploded perspective view.

Turning now to FIG. 1, a smart card 1 is shown in an exploded perspective view. The smart card 1 may comprise a first coil 3, a second coil 12, and a third coil 4. The smart card 1 may also comprise an integrated circuit (IC) module coil 8, a microchip 6, and a capacitive element 15. In some examples, the first coil 3 may be a coupler coil and the third coil 4 may act as an antenna coil. The second coil may be separate from the third coil and may be a non-radiating component as will be herein described. An axis system is provided in FIGS. 1-9, wherein an x-axis corresponds to a horizontal axis, a y-axis corresponds to a vertical axis, and a z-axis corresponds to a longitudinal axis.

The smart card 1 may comprise multiple layers. The third coil 4, the first coil 3, the second coil 12, and the capacitive element 15 may be embedded in the same layer, in particular in an antenna substrate 5. After embedding the coils, the antenna substrate 5 is laminated with card substrates 10 to form a sandwich structure, as will be further described with respect to FIGS. 9 and 10.

Further, the first coil 3 is configured with turns that define the perimeter of a first surface area of the smart card 1 and define a first interior space surrounded by turns of the first coil 3. Similarly, the second coil 12 may comprise turns defining a perimeter of a second surface area and a second interior space within it. The third coil 4 with turns defines the perimeter of a third surface area and a third interior space.

Moreover, the third coil 4 may have a larger diameter than the first coil 3 and the second coil 12. Accordingly, the third surface area may be larger than the first and second surface areas. In this regard, in some embodiments, the second coil 12 and/or the first coil 3 may be arranged in the third interior space within the third surface area, wherein the first and second surface areas do not overlap one another and the second coil 12 is separate from the first coil 3 and the third coil 4.

In this context, "separate" particularly refers to a spatial separation, in particular enabling each coil to generate its own magnetic field independently. However, the coils can still be interconnected, possibly configured in serial or parallel arrangements. This refers in particular to the separation of the second coil from the third coil, as well as the separation of the second coil from the first coil. However, the first coil can also be separated from the third coil. This spatial separation can reduce the risk of interference between different functional areas of the card, thereby improving the reliability and performance of the card's electronic functions.

The third coil 4 may be electrically connected to the second coil 12 and to the first coil 3. The second coil 12 and the capacitive element 15 may form a resonance circuit and may be configured to match the third coil 4 with the external reader for optimized signal reception and transmission. In addition, the IC module 8 may be electrically connected to the microchip 6. The IC module 8 may be positioned in relation to the first coil 3 such that a magnetic field generated by the first coil 3 induces a current in the IC module coil 8. An end of the second coil 12 may be electrically interconnected to an end of the third coil 4, which may increase field intensity as compared to a field intensity of either the second or third coil along or the combined field intensity of the second and third coils together without interconnecting ends.

In some examples, the capacitive element 15 may be configured as an integral part of the second coil 12, formed by extending wire ends from the second coil 12. The capacitive element 15 may not comprise any electrodes associated with the capacitive element. Further, the IC module coil 8 may be situated on a different layer than the first coil 3, the third coil 4, the second coil 12, and the capacitive element 15. The IC module coil 8 may be mounted on an IC module 2 which includes a module substrate 9. The microchip 6 may also be mounted on the IC module 2. For assembly of the IC module 2, an engagement hole 11 and an alternative engagement hole 20 may be provided in the card substrate 10 through a milling process.

In order to facilitate data transfer between the smart card 1 and an external reader, a high-frequency magnetic field is generated by the external reader. When the smart card 1 is situated within the high-frequency magnetic field, a current is induced in the third coil 4. The third coil 4 may be specifically tuned to the resonant frequency of the external reader's antenna by connecting the resonance circuit comprising the second coil 12 with the capacitive element 15 to the third coil 4. Since the third coil is tuned to the resonant frequency and the first and second coils are not close to the resonant frequency due to their design, the amount of induced current in the first and second coils is an order of magnitude lower than the current induced in the third coil. Accordingly, the sensitivity of reception depends greatly on characteristics of the third coil.

The design approach ensures that the smart card can operate effectively within transmission protocols such as AM (Amplitude Modulation) and SSB (Single Side Band), maintaining clear and reliable communication. Amplitude Modulation (AM) is generally a modulation technique used in wireless communication to transmit information through waves. In this method, the amplitude of a carrier wave, typically a sine wave, is varied in direct proportion to the amplitude of the signal being transmitted. Single Side Band (SSB) is generally a refinement of amplitude modulation that reduces bandwidth and power usage by eliminating one of the sidebands and the carrier frequency in an AM signal. SSB transmits only one of the sidebands (either upper or lower) which contains the actual information, making it more efficient than AM.

Using the high-frequency magnetic field, information can be transmitted. In this setup, the smart card can send information back to the reader. The external reader emits an electromagnetic field through its antenna, which the smart card captures. Through induction, a current is generated in the smart card's antenna coil, powering the microchip. This activated microchip may decode commands from the external reader. Subsequently, the smart card can encode and modulate the response into the emitted field. This allows the smart card to transmit its serial number or other requested information. The smart card itself does not produce a field but modifies the electromagnetic transmission field of the reader. By changing the impedance via integrated switching circuits, a distinct signal can be created. This alteration in the field can be detected by the external reader and utilized for digital communication. The smart card can modulate the carrier signal, which is then received by the reader for communication.

The second coil 12 may be separate from the third coil 4 and may not actively radiate or significantly absorb radiation from the external reader due to its design, which does not match it with the external reader's antenna. Thus, the second coil 12 may be a passive component in the smart card 1. The second coil 12 instead may optimize the efficiency of the energy transfer by matching the third coil 4 with the external reader, helping to enhance the overall performance of the system without directly participating in the active communication process. This configuration may ensure that the primary absorption of the emitted energy is performed by the third coil 4, thereby increasing the efficiency of the card in data transmission.

The larger diameter of the third coil compared to the first and second coils can increase the effective inductive coupling area, which may enhance the range and strength of communication with external reader antennas. The separation of the second coil from the third coil allows for the third coil to be specifically optimized for interactions with reader antennas. Additionally, the increased diameter of the third coil permits the accommodation of the other two coils within its structure, thereby supporting a compact and integrated design.

Additionally, the induced current may be substantially higher in the third coil 4 compared to the IC module coil 8, which is directly connected to the microchip 6. As a result, the received signal's sensitivity of the smart card 1 is greatly influenced by the characteristics of the third coil 4. The received signal or induced current in the third coil 4 is then transferred to the first coil 3. Due to the close coupling of the first coil 3 and IC module coil 8, the signal may be more efficiently transmitted to the microchip 6.

The configuration of the first, second, and third coils with distinct interior spaces and perimeters allows for the optimization of the card's inductive coupling capabilities with various external reader antennas, enhancing communication reliability. The arrangement of the second coil within the third interior space as a passive component of an LC network facilitates matching the resonance characteristics of the third coil with the external readers antenna. Moreover, this arrangement allows for a compact design of the coils, particularly of the third coil, which maintains effective bidirectional communication capabilities. Since the third coil is matched to an external reader antenna by the second coil, the matching of the third coil to the external reader is not determined solely by the geometric design of the third coil. A small third coil can therefore be used which is still matched to the external reader by the second coil. This leads to more space on the card for personalization, e.g. by laser engraving.

The first coil can be used to ensure that the signal or energy received from the third coil is transmitted to an IC module, which includes a microchip, via inductive coupling. Therefore, the first coil can be electrically connected to the third coil. When a current is induced in the third coil, it simultaneously induces a current in the first coil, which in turn generates a magnetic field. This first coil is positioned in relation to an IC module coil such that the magnetic field it generates can induce a current in the IC module coil. The IC module coil, located on the IC module, then supplies current to the microchip. Thus, the first coil also functions as a first coupler coil and the IC module coil as a second coupler coil. Insofar, the first coil may be configured to couple to an IC module coil. By configuring the first coil to couple specifically to an IC module coil, the design ensures a dedicated and efficient energy transfer pathway for powering the smart card's microchip. The first coil is further designed so that it does not match with the external reader and, as a result, does not effectively absorb any energy from it.

Moreover, the first coil, the second coil and the third coil may have different pitches. Having coils with different pitches can allow for the optimization of each coil's inductive properties for specific functions, such as energy transfer or data communication, leading to enhanced overall performance of the smart card. In this regard, the pitch of the first coil is adjusted such that there is a good coupling between the first coil and the third coil. The pitch of the third coil is adjusted such that there is a good coupling between the first coil and the second coil and the external reader antenna. The pitch of second coil is adjusted such that there is a good coupling between the first coil and third coil. The pitch of a coil can, for example, be defined as the distance between the individual turns or loops of the coil.

Figure 2:
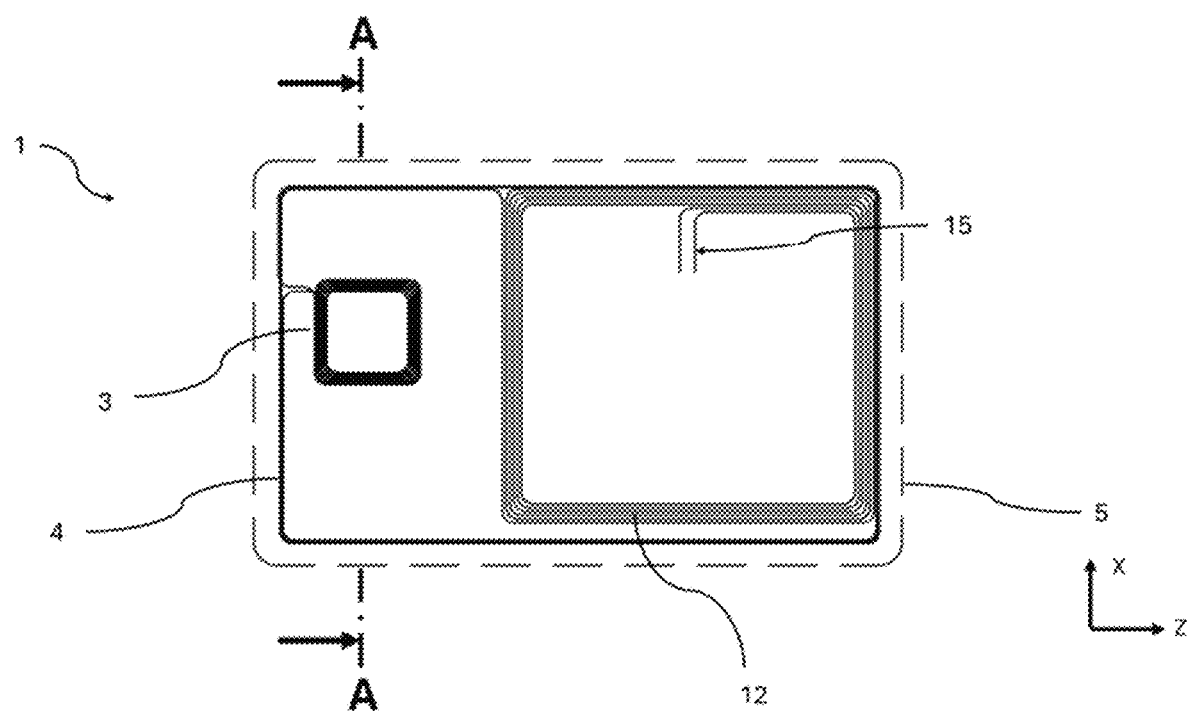
FIG. 2 shows a longitudinal sectional view of a smart card with an antenna substrate shown in a top view.

Turning now to FIG. 2, a longitudinal sectional view of the smart card 1 with the antenna substrate 5 is shown in a top view. As described with respect to FIG. 1, the antenna substrate 5 may comprise the first coil 3, the second coil 12, and the third coil 4. The first coil 3, the second coil 12, and the third coil 4, as well as the capacitive element 15, may be embedded into the antenna substrate 5 with a constant force. Several embedding methods are possible without departing from the scope of this disclosure. In some examples, the embedding may be performed without the use of any conductive foil, conductive layer, laser ablation, or etching, thus reducing manufacturing time and complexity.

As an example, the first, second, and third coils may be applied via ultrasonic vibration along with constant downward force for embedding the wires into the antenna substrate 5. Embedding may be carried out, for example, by laying the first coil 3, the third coil 4, the second coil 12, and the capacitive element 15 in the antenna substrate 5 by using ultrasonic vibration along with constant downward force. Furthermore, the third coil 4, the first coil 3, and the second coil 12, and in some examples also the capacitive element 15, may be made from a single piece of wire. For example, in some instances, the second and third coils may be made from a single piece of wire or from a single continuous length of wire having the same winding directions for both the second and third coils. In some instances, the first and third coils may be made from a single piece of wire or from a single continuous length of wire having the same winding directions for the first and third coils. In yet other instances, all of the first, second, and third coils may be made from a single piece of wire or a single continuous length of wire. The single piece of wire may provide the same winding direction for the third coil 4, the first coil 3, and/or the second coil 12 as noted. The uniform winding direction for both the first and third coils ensures consistent electromagnetic properties across the smart card, which can improve the reliability and performance of wireless communication functions. Further, no welding or soldering may be demanded to connect sections of the wire that are used in each of the described circumstances, thus reducing manufacturing time and need for repeat soldering.

FIG. 2 shows a first embodiment of the smart card 1 in which the second coil 12 and third coil 4 are in a first size configuration. The first size configuration may be considered "full size" in which the second interior space within the second coil 12 comprises a majority of the total area of the antenna substrate 5 and the dimensions of the third coil 4 are proportional to dimensions of the antenna substrate 5.

Figure 3:
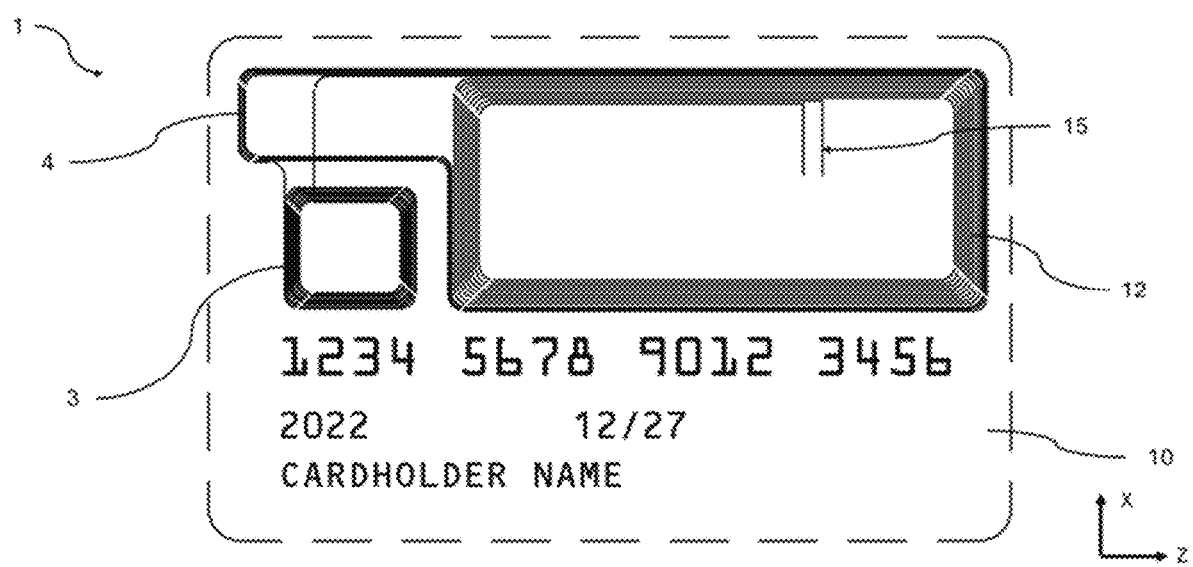
FIG. 3 shows a smart card comprising a half size third coil in top view.

FIG. 3 shows the smart card 1 in a top view. FIG. 3 shows the both the top layer of the smart card 1 (e.g., the card substrate 10) as well as a schematic depiction of the components of the antenna substrate 5, including the first, second, and third coils 3, 12, and 4 and the capacitive element 15. FIG. 3, in contrast to FIGS. 1 and 2, shows a second embodiment of the smart card 1 in which the second coil 12 and third coil 4 are in a second size configuration. The second size configuration may be considered "half-size" such that the second interior space within the second coil 12 and the third interior space are is half the respective areas compared to the first size configuration. As an example, the half-size third coil 4 may have dimensions of 80 mm by 26 mm. In both the second and the first embodiments, the second coil 12 may within the third interior space of the third coil 4. Specifically, the second surface area may be encompassed within the third surface area. The third coil 3 may have a larger diameter than the first coil 3 and the second coil 12. Accordingly, the third surface area is larger than the first and second surface areas. In this regard, the second coil 12 is arranged in the third interior space within the third surface area. In contrast, the first coil 3 is not enclosed by the third coil 4.

Further, the first coil 3 and the second coil 12 may have 9 turns when wound and embedded in the antenna substrate 5 while the half-size third coil 4 has 6 turns. "Turns" in this instance, may refer to the number of times the wire is wound around the core of the coil. With these number of turns, the inductance of the third coil 4 may be approximately 4 µH, with a capacitance of approximately 5 pF, yielding a resonant frequency of 325 MHz. Tuning the third coil 4 to a resonant frequency of 13.56 MHz may comprise matching of the second coil 12 by providing an additional resonance circuit (e.g., an inductance-capacitance (LC) network)) with a capacitance of 30 pF. The resulting resonant frequency of the third coil 4 may thus match or nearly match the resonant frequency of the external reader which may be 13.56 MHz. Therefore, as the second coil 12 is a passive component separate from the third coil 4, the resonance circuit (e.g., LC network) may be provided that allows for more efficient and accurate data transmission with the external reader.

As already mentioned above, second coil may be configured as a non-energy capturing and non-energy absorbing component that is not involved with signal transmission between the smart card and the external reader. The second coil is insofar configured so as to reduce or avoid being a load to a send coil of the external reader. Due to its design, the second coil is not tuned to the resonant frequency of the external reader's antenna, which means that it only absorbs minimal or almost no energy when exposed to the reader's high-frequency magnetic field. This effectively prevents the magnetic field generated by the second coil from interfering with the third coil, which could otherwise disrupt the received signal. It has been shown that the energy absorption of the second coil and the magnetic field generated by it is within the range of the normal noise already acting on the smart card, and in particular on the third coil.

In the context of communication systems, noise refers to any unwanted electrical or electromagnetic interference that distorts or corrupts the signal being transmitted. Noise can originate from various sources, both internal and external to the system, including thermal activity within electronic components, electromagnetic disturbances from other electronic devices, and atmospheric phenomena such as lightning and solar flares.

In some examples, as noted, the third coil 4 may be electrically connected to both the second coil 12 and the first coil 3. Specifically, as described above, the second and third coils may be interconnected at ends that allows for increased field intensity. Additionally, the capacitive element 15 may be configured as an integral part of the second coil 12, formed by extending wire ends from the second coil 12 into the second interior space.

With the second and third coils 12 and 4 in the second size configuration, the smart card 1 may be further personalized through embossing or laser engraving. As an example, as shown in FIG. 3, a cardholder name, expiration date, and card number may be engraved or embossed onto the smart card 1.

Figure 4:
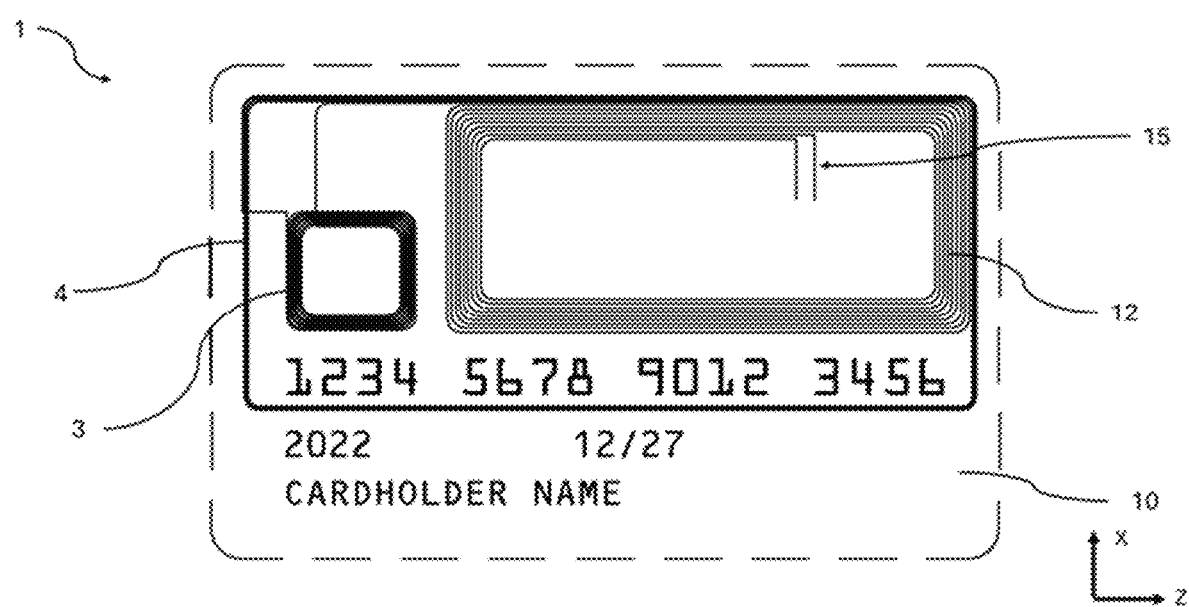
FIG. 4 shows a smart card comprising a two-thirds size third coil in top view.

Turning now to FIG. 4, the smart card 1 is shown according to a third embodiment. In FIG. 4 the top layer of the smart card 1 is shown as well as schematic depiction of components of the antenna substrate 5. The smart card 1 as shown in FIG. 4 is similar to as shown in FIG. 3. FIG. 4 shows the smart card 1 with a third size configuration of the second and third coils 12, 4. In particular, the third size configuration includes the third coil 4 as ⅔ the size of the full size configuration (e.g., the first size configuration).

In the third size configuration, the third coil 4 may have a larger area than the second size configuration but a smaller area than the first size configuration. As an example, the third coil 4 in the third size configuration may have dimensions of 80 mm by 35 mm. In the third size configuration, the first coil 3 may comprise 9 turns, the second coil 12 may comprise 11 turns, and the third coil 4 may have 3 turns.

To enhance coupling between the third coil 4 and the external reader's antenna, the third coil 4 in the third size configuration may be used instead of the second size configuration. The number of turns in the third coil 4 may be reduced in the third size configuration compared to the second size configuration in order to run the third coil 4 wire between the embossed information on the top layer of the smart card 1, for example. Consequently, the capacitance of the third coil 4 is decreased. In order to achieve the resonant frequency of the external reader with the smart card 1 in the third size configuration, the number of turns of the second coil 12 may be increased compared to the second size configuration. Thus, the number of turns of the respective coils may be adapted for the particular configuration and application of the card.

In the third embodiment, the third coil 4 may have a larger diameter than the first coil 3 and the second coil 12. Accordingly, the third surface area may be larger than the first and second surface areas. In this regard, the second coil 12 and the first coil 3 are arranged in the third interior space within the third coil 4. When arranged within the third interior space, the first and second coils 3, 4 may not overlap.

Figure 5:
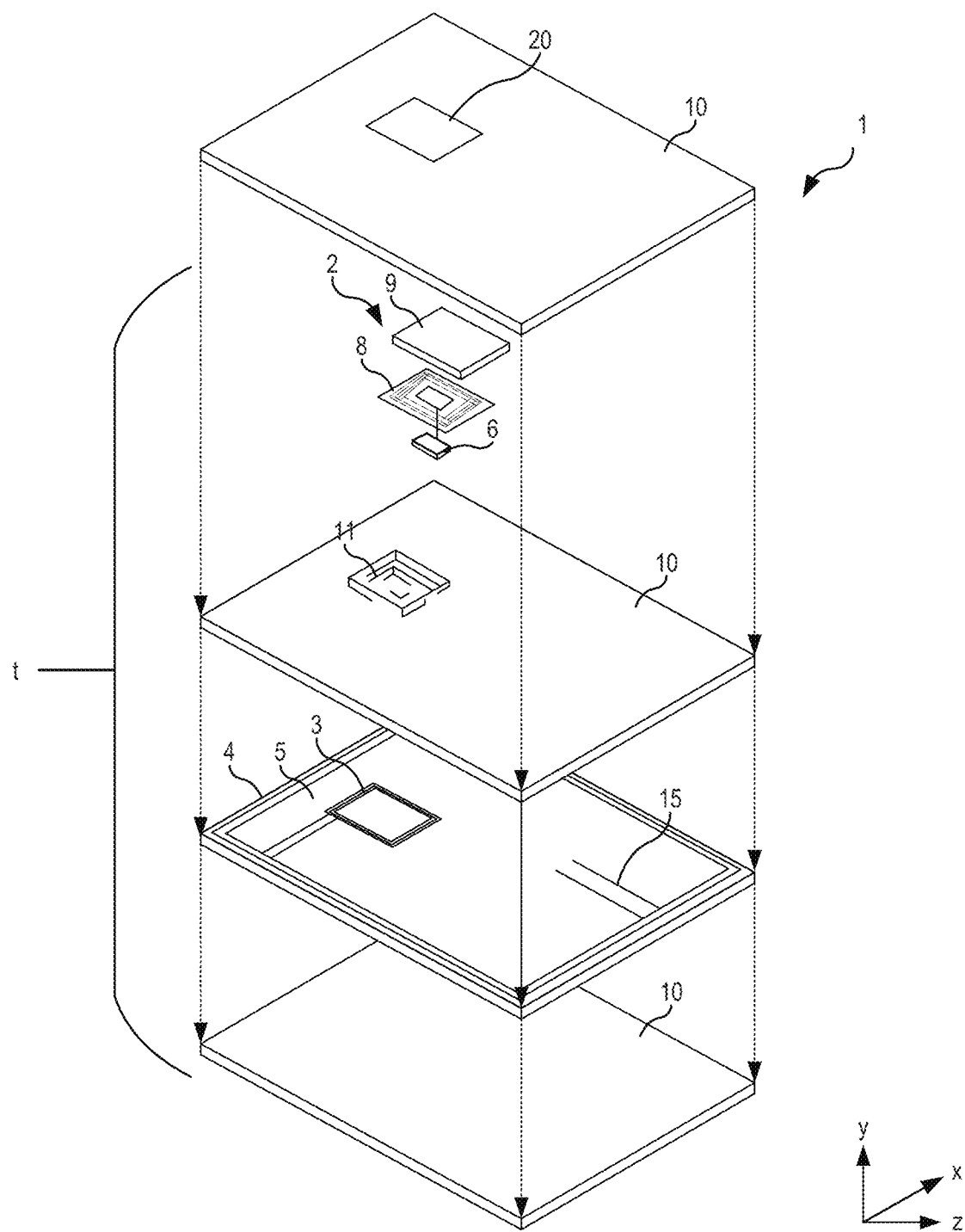
FIG. 5 shows a smart card in an exploded perspective view.

Turning now to FIG. 5, another exploded perspective view of the smart card 1 is shown according to the second embodiment of the present disclosure. The smart card 1, as previously described, comprises the first, second, and third coils 3, 12, and 4. The third coil 4 may be an antenna coil and may serve both to receive energy and to exchange information with the external reader. The third coil 4 may thus be electromagnetically coupled with the external reader for data exchange.

As previously described, the first coil 3 may comprise turns of wire defining a perimeter of the first surface area of the smart card 1 and defining the first interior space within the first surface area surrounded by the turns of wire. The third coil 4 may also comprise turns of wire defining a perimeter of the third surface area of the smart card and defining the third interior space within the third surface area surrounded by the turns of wire of the third coil 4. In any of the first, second, and third embodiments, the second coil 12 may be arranged to cover a relatively large surface area, compared to the surface area of the first coil for example, so as to provide increased stability of the smart card 1.

The capacitive element 15 may be connected to the ends of the third coil 4 forming a parallel resonance circuit that enhances the smart card's efficiency in data transfer. The microchip 6, incorporated within the IC module 2, may be connected to the IC module coil 8. The proximity of the first coil 3 to the IC module coil 8 may allow for signal transmission through inductive coupling, which may occur without a direct electrical connection. The IC module 2 may also include a module substrate 9 and may be mounted in the engagement holes 11, 20 created in the card substrate 10.

The smart card 1, by nature of the antenna substrate being embedded with ultrasonic vibration and constant downward force rather than variable forces during embedding, as previously described, may be free from metal layers. Thus, the metal weight of the smart card 1 as a whole may be decreased, for example to less than 40% of the total weight of the smart card 1, thereby reducing the overall weight of the smart card 1. Reducing the amount of metal, and specifically having a non-metallic antenna substrate may reduce potential electrical interference issues.

Figure 6:
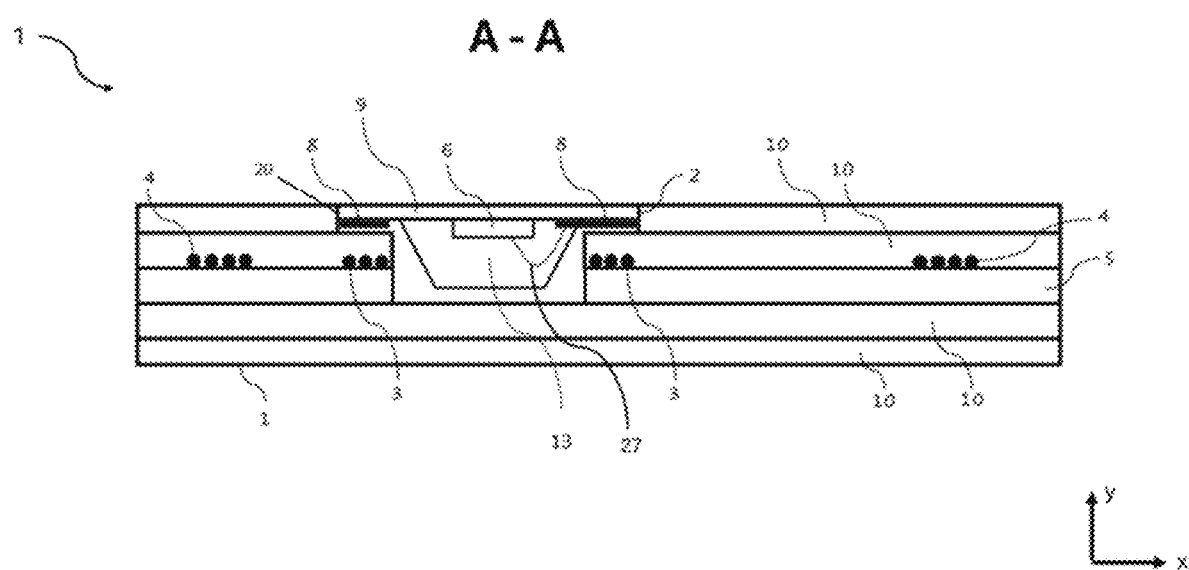
FIG. 6 shows a cross-sectional view of a smart card.

FIG. 6 shows a cross-sectional view of the smart card 1 from cross-section A-A, as depicted in FIG. 5. As noted with respect to FIG. 1, the smart card 1 may comprise multiple layers. The multiple layers may comprise the antenna substrate 5 and one or more card substrates 10. In some examples, none of the multiple layers are composed of entirely metal and the metal components of the smart card 1 comprise no more than 40% of the overall weight of the smart card 1.

As described above, the first coil 3, the second coil 12, and the third coil 4 may be embedded in the antenna substrate 5. In some examples, the antenna substrate 5 may be disposed between a first and second card substrate 10, where the first card substrate 10 is disposed above the antenna substrate 5 and the second card substrate 10 is disposed below the antenna substrate 5. In other examples, a third and fourth card substrate 10 may also be disposed around the antenna substrate 5, wherein the first and third card substrate 10 are disposed above the antenna substrate 5 and the second and fourth card substrate 10 are disposed below the antenna substrate 5. The respective layers of substrate may be bonded together.

In some examples, the antenna substrate 5 is formed of materials such as polyvinyl chloride (PVC), polyimide, polycarbonate, or polyethylene terephthalate (PET), while the card substrate 10 layers are formed of PCV and/or a printed layer.

The engagement hole 20 may be milled into the card substrates 10 and/or the antenna substrate 5 and may extend through all the layers of the smart card 1, including through the antenna substrate 5 and each of the card substrates 10. The IC module 2 may be mounted within the engagement hole 20. The IC module 2 may comprise the module substrate 9, the microchip 6, and the IC module coil 8. The microchip 6 may be connected to the IC module coil 8 by wire bonding 27. Both the wire bonding 27 and the microchip 6 may be encapsulated by dam-and-fill encapsulation material 13. In addition, the IC module coil 8 may be aligned so that its center lies over the center of the first coil 3. The individual windings of the first coil 3 and the IC module coil 8 are also positioned on top of each other in some examples.

Figure 7:
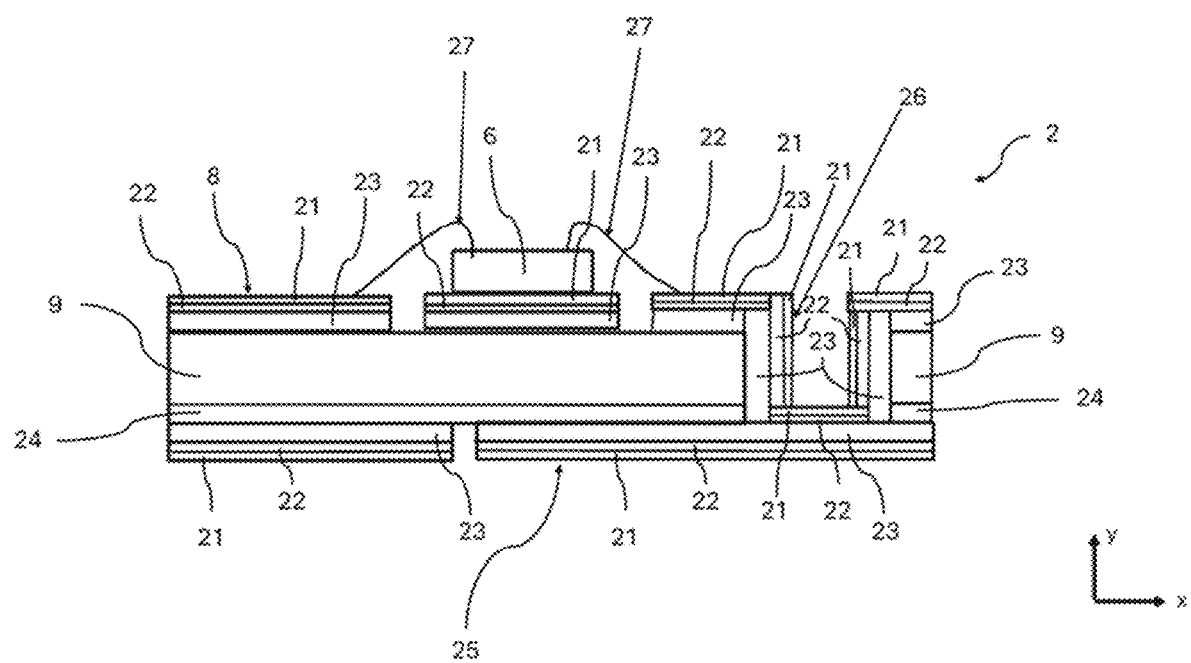
FIG. 7 shows a cross-sectional view of an IC module of a smart card.

Turning now to FIG. 7, a cross-sectional view of the IC module 2 is shown. As noted, the IC module 2 comprises the module substrate 9. The module substrate 9 may be clad with copper foil 23 on both sides and partially connected by an adhesive layer 24. The IC module coil 8 may be formed directly on a first side of the module substrate 9 by etching the copper-clad substrate. Additionally, gold plating 21 and nickel plating 22 may be applied to the copper foil 23 through a deposition process, in some examples. The microchip 6 may be wire-bonded to the first coil 3 via the wire bonding 27.

Further, the IC module 2 may comprise terminal electrodes 25 configured as a contact-type transmission section. The inclusion of terminal electrodes on the module substrate allows for reliable electrical contact when the card is used in contact-type readers, ensuring consistent data transmission. These electrodes 25 may be formed on a second side of the module substrate 9 by the etching of the copper foil 23. The terminal electrodes and the IC module coil can be formed on different surfaces of the module substrate by etching the double-sided cladded module substrate. Forming terminal electrodes and the IC module coil on different surfaces of a double-sided cladded module substrate optimizes the use of space and can reduce the overall thickness of the card. The electrodes 25 and the microchip 6 may be connected together via structure 26 which includes through holes that may be filled with conductive material. The IC module coil 8, contrarily, may be a non-contact type transmission section. Thus, the arrangement allows dual interface operations with the smart card 1, including both contact and non-contact transmission. The IC module's dual functionality, with terminal electrodes for contact-type transmission and an IC module coil for non-contact-type transmission, offers versatility in communication methods, allowing the card to be used with a wider range of external communication devices. By incorporating both contact and non-contact transmission sections within the same IC module, the card can provide seamless user experiences, switching between transmission modes as required without the need for additional external components.

Further, the microchip can be connected to the terminal electrodes of the module substrate via through-holes that are filled with a conductive material. Connecting the microchip to the terminal electrodes via through-holes filled with conductive material ensures a robust and durable electrical connection that can withstand mechanical stress. The use of through-holes filled with conductive material for chip connection allows for a more streamlined design by eliminating the need for wire bonding or surface-mount techniques.

Figure 8:
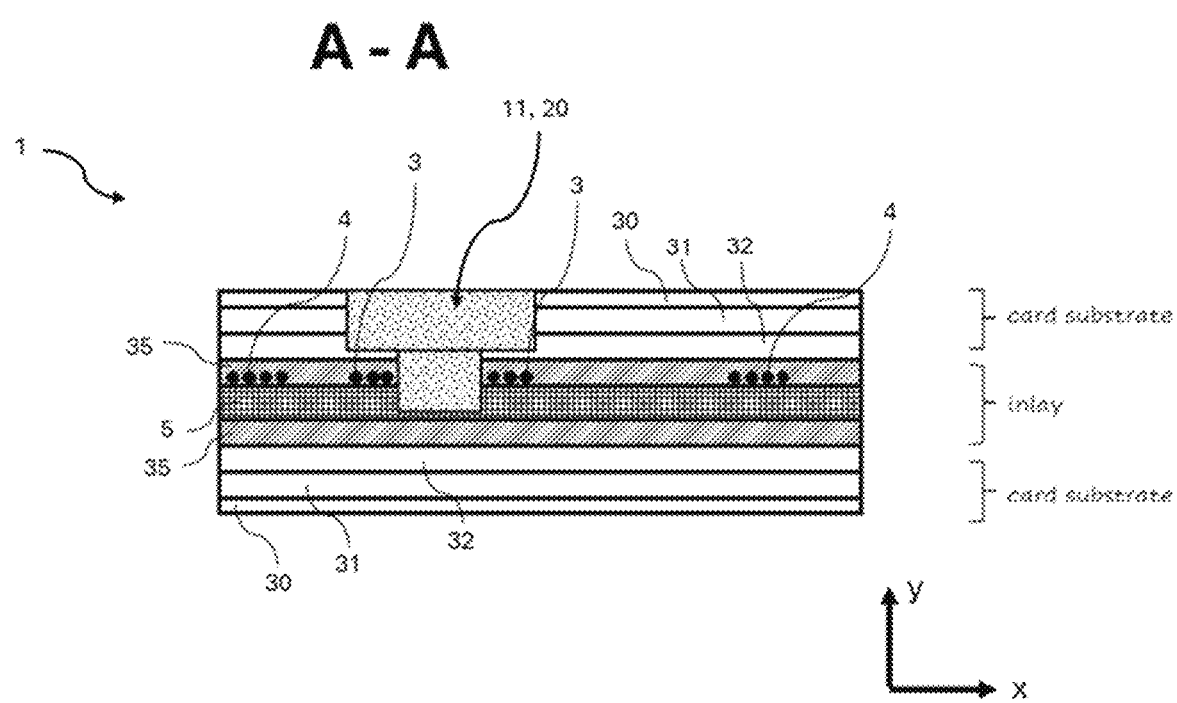
FIG. 8 shows a cross-sectional view of a smart card comprising an inlay.

FIG. 8, similar to FIG. 6, shows a cross-sectional view of the smart card 1. The smart card 1 comprises multiple layers, including the antenna substrate 5, which may be an inlay, and a plurality of card substrates 10. In the arrangement of the smart card 1 shown in FIG. 8, the antenna substrate 5 may be arranged between two card substrates 10 and may be permanently connected to the two card substrates via lamination.

In addition to the antenna substrate 5, the inlay may comprise two compensation layers 35 located respective above and below the antenna substrate 5. The card substrates 10 may be formed of a printed layer 32 and a PCV layer 31 or an overlay layer 30, all of which are permanently bonded or laminated to the inlay. The individual layers of the smart card 1 may have defined thicknesses. For example, the antenna substrate 5 may have a first thickness such as 150 microns, the compensation layers 35 may have a second thickness such as 105 microns, the printed layer 32 may have a third thickness such as 100 microns, the PCV layer 31 may have the third thickness as well, and the overlay layer 30 may have a fourth thickness such as 50 microns. Other thicknesses are possible however. In some examples, the overlay layers 30 may be applied to the smart card 1 separately from the inlay, printed layer 32 and PVC layer 31, thereby allowing for customization of the type of overlay layer chosen.

Figure 9:
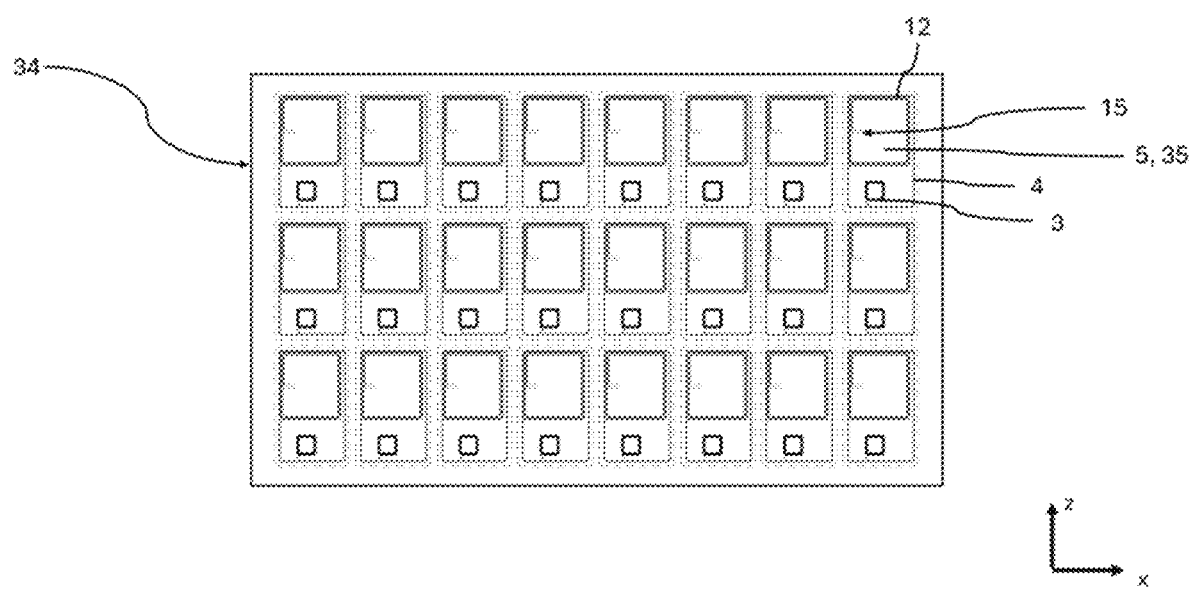
FIG. 9 shows a cross-sectional view of an inlay comprising an antenna substrate.

Turning now to FIG. 9, a sheet 34 of an inlay with an antenna substrate, such as antenna substrate 5 is shown. The sheet 34 may be segmented into different sections, each of which is associated with a particular smart card. Within each section, wires may be embedded to form the first coil 3, the third coil 4, the second coil 12, and the capacitive element 15 of each particular smart card. As noted, the antenna substrate 5 may be positioned between two compensation layers 35, thus forming the inlay.

Figure 10:
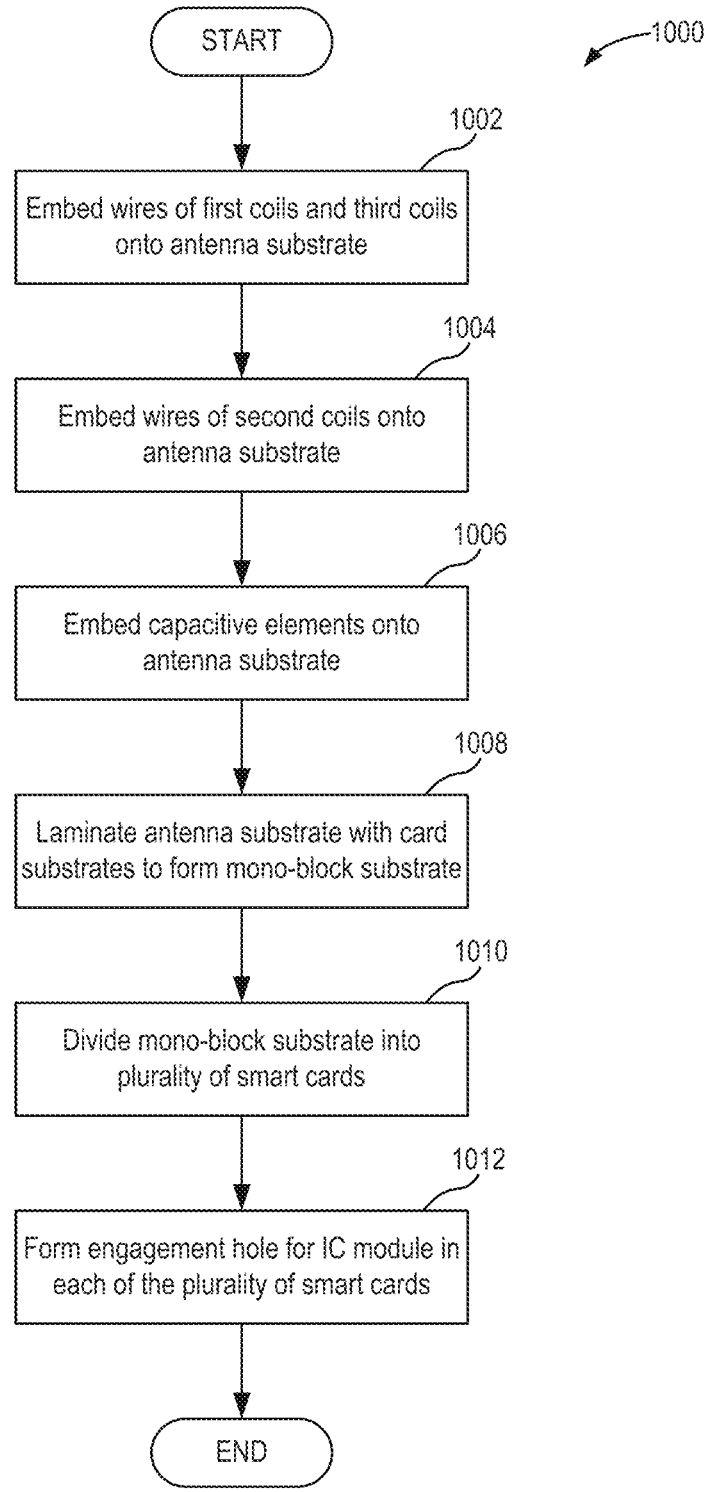
FIG. 10 shows a flowchart illustrating a method for constructing a smart card.

In a process of manufacture, as will be further described with respect to FIG. 10, the sheet 34 may be constructed by embedding the respective coils of each particular smart card in the antenna substrate 5, then disposing the antenna substrate between the compensation layers 35 to form the inlay. Then, the printing layers 32, the PVC layers 31 and the overlay layers 30 may be assembled. The printing layers 32, PVC layers 31, and overlay layers 30 may be laminated to the inlay sheet using heat and pressure over a predetermined amount of time to form a mono-block of layers.

From the mono-block of layers, each particular smart card may be extracted. As an example, the mono-block of layers, arranged as a sheet, may be cut at predetermined areas to define each of the particular smart cards. Once the individual cards are extracted from the mono-block of layers, a cavity for the IC module 2 for each of the smart cards is milled into each card. After milling, the IC module 2 may be embedded into each particular card. With the IC module 2 embedded in the card, each smart card may comprise all of the needed components as herein described.

Turning now to FIG. 10, a flowchart illustrating a method 1000 for forming a smart card is shown. The smart card as described herein may be the smart card 1 described with respect to FIGS. 1-9. In some examples, the smart card may have coils with a first size configuration, as shown in FIG. 2, a second size configuration, as shown in FIG. 3, or a third size configuration, as shown in FIG. 4.

At 1002, method 1000 includes embedding wires of first coils and third coils onto an antenna substrate. As described with respect to FIG. 9, the antenna substrate may be formed as part of a sheet that comprises multiple sections, each section corresponding to a smart card. Each first coil may be a coupler coil and may comprise turns of wire that define a perimeter of a first surface area of the smart card, thereby defining a first interior space within the first surface area surrounded by the wire of the first coil. Similarly each third coil may be an antenna coil and may comprise turns of wire that define a perimeter of a third surface area, thereby defining a third interior space within the third surface area surrounded by the wire of the third coil.

At 1004, method 1000 includes embedding wires of second coils onto the antenna substrate. The second coils may be separate from both the first and third coils in each respective card. The second coil may have turns of wire defining a perimeter of a second surface area, thereby defining a second interior space within the second surface area surrounded by the wire of the second coil. The first and/or second coils may be embedded onto the antenna substrate within the third interior space of the respective third coil, in some examples. For example, in the first and third size configurations of the second and third coils, the first and second coils may be positioned within the interior space of the third coil. In other examples, such as in the second size configuration of the second and third coils, the second coil may be positioned within the interior space of the third coil while the first coil may be positioned outside the interior space of the third coil. Thus, the third surface area may be larger than the first and second surface areas and in some examples, the third surface area may include the first and/or second surface areas.

The first, second, and third coils of each of the smart cards may be embedded in the antenna substrate via constant downward force and/or ultrasonic vibration. Thus, the coils may be embedded into the non-metallic substrate (e.g., the antenna substrate) without variable downward force or use of conductive foil, a conductive layer, laser ablation, or etching. Avoiding the use of laser ablation or etching also reduces the environmental impact of the manufacturing process, as it eliminates the need for chemicals and reduces energy consumption. Some materials may be sensitive to the high temperatures and physical stresses induced by laser ablation or etching. Using a method that excludes these techniques can allow for a broader range of materials to be used effectively, potentially enhancing the functionality and durability of the smart cards.

At 1006, method 1000 comprises embedding capacitive elements onto the antenna substrate for each of the smart cards. In some examples, the capacitive element may be configured as an extension of the second coil. The second coil and the capacitive element together may form an LC network. The capacitive elements may similarly be embedded via ultrasonic vibration and/or constant downward force.

At 1008, method 1000 comprises laminating the antenna substrate with card substrates to form a mono-block substrate. As is described above, multiple card substrates may be disposed about the antenna substrate as layers of the smart card. The antenna substrate, when configured as a sheet with a plurality of sections each intended for a corresponding smart card of a plurality of smart cards, may be laminated with the card substrate layers. Lamination of the layers may thus form the mono-block substrate. The mono-block substrate may also be a sheet with a plurality of sections corresponding to the plurality of smart cards.

At 1010, method 1000 includes dividing the mono-block substrate into the plurality of smart cards. As described with respect to FIG. 9, the plurality of sections of the sheet may be divided via cutting (e.g., via a laser) in order to separate the plurality of sections from one another.

At 1012, method 1000 includes forming an engagement hole for an IC module in each of the plurality of smart cards. As is described above, the IC module may comprise an IC module coil, a microchip, and a module substrate with electrodes. The module substrate may be cladded with copper foil and the electrodes and the IC module coil may be formed on different surfaces of the substrate module by etching the copper cladded module substrate. The microchip may be connected to the IC module coil by wire bonding. The IC module may be attached to the engagement hole that is formed through the smart card.

The technical effect of the smart card as herein provided is that, with the addition of the second coil as a non-radiating, passive component, the smart card may optimize the efficiency of the energy transfer by matching the third coil with the external reader, helping to enhance the overall performance of the system without directly participating in the active communication process. Further, with the second passive coil being disposed within an interior space of the antenna coil (e.g., the third coil) and connected to the antenna coil, the field intensity may be increased. Through this design, the smart card achieves a higher sensitivity and more reliable data exchange, allowing for flexibility in use with different applications that demand secure and rapid communication.

FIGS. 1-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A smart card, comprising:
a first coil having turns of wire defining a perimeter of a first surface area of the smart card and defining a first interior space within the first surface area surrounded by turns of wire of the first coil;
a second coil having turns of wire defining a perimeter of a second surface area of the smart card and defining a second interior space within the second surface area surrounded by turns of wire of the second coil;
a third coil having turns of wire defining a perimeter of a third surface area of the smart card and defining a third interior space within the third surface area surrounded by the wire of the third coil;
a non-metallic substrate of the smart card into which the first, second, and third coils are arranged, the non-metallic substrate being free from conductive and/or metallic foil and conductive and/or metallic layers;
wherein a winding direction of the first coil is the same as a winding direction of the third coil; and
a microchip connected to an integrated circuit (IC) module coil, wherein the first coil, the second coil, and the third coil are arranged outside of the microchip.

2. The smart card of claim 1, wherein the first, second, and third coils are laid into the non-metallic substrate via constant downward force for the duration of wire embedding, without laser ablation or etching.

3. The smart card of claim 1, wherein the second coil is configured as a passive, non-radiating component of an inductive-capacitive (LC) network for matching the third coil with an external reader antenna.

4. The smart card of claim 3, further comprising a capacitive element, wherein the second coil and the capacitive element form the LC network, and wherein the microchip and the IC module coil are integrated into a module substrate different than the non-metallic substrate.

5. The smart card of claim 1, wherein the second coil is arranged within the third interior space.

6. The smart card of claim 1, wherein the second coil is separate from the third coil, the third coil being larger in diameter than the first and second coils.

7. The smart card of claim 1, wherein the third surface area includes the first and second surface areas and the first and second surface areas do not overlap one another.

8. A method for wire embedding for a smart card, the method comprising:
embedding wires of a first coil and a third coil onto an antenna substrate of the smart card using a constant downward force for the duration of wire embedding, wherein the first coil has turns of wire defining a first interior space within a first surface area and the third coil has turns of wire defining a third interior space within a third surface area.

9. The method of claim 8, further comprising, embedding a wire of a second coil to the antenna substrate using constant downward force, wherein the second coil has turns defining a second interior space within a second surface area.

10. The method of claim 9, wherein embedding the first, second, and third coils comprises applying ultrasonic vibration along with the constant downward force.

11. The method of claim 9, wherein the second coil is arranged within the third interior space, wherein the third coil is larger in diameter than the first and second coils.

12. The method of claim 8, further comprising laminating the antenna substrate with a plurality of card substrates to form a mono-block substrate, wherein laminating does not include use of adhesives.

13. The method of claim 8, wherein the first coil is a coupler coil, the third coil is an antenna coil, and the second coil is a passive component.

14. The method of claim 8, wherein the antenna substrate is provided in a sheet divided into a plurality of sections, wherein each of the plurality of sections is intended for a corresponding smart card.

15. The method of claim 8, further comprising embedding wire of a capacitive element to the antenna substrate using constant downward force.

16. A smart card, comprising:
a first coil defining a first surface area of the smart card and defining a first interior space within the first surface area surrounded by turns of wire of the first coil;
a second coil defining a second surface area of the smart card and defining a second interior space within the second surface area surrounded by turns of wire of the second coil;
a third coil defining a third surface area of the smart card and defining a third interior space within the third surface area surrounded by turns of wire of the third coil;
a capacitive element formed of one of wire of the second coil and a pair of conductors arranged at an end of the second coil;
wherein the second coil is configured to increase matching of the third coil, which acts as an antenna coil, to the resonant frequency of an external reader; and
a microchip connected to an integrated circuit (IC) module coil, wherein the first coil, the second coil, and the third coil are arranged outside of the microchip.

17. The smart card of claim 16, wherein the first and second coils are arranged within the third interior space of the third coil.

18. The smart card of claim 16, wherein the second coil and the capacitive element for an inductive-capacitive (LC) network, the third coil is connected to the first coil and the second coil, the IC module comprises an IC module coil that is connected to the microchip, and the first coil is arranged with respect to the IC module coil to allow for a current to be induced in the IC module coil by a magnetic field generated by the first coil.

19. The smart card of claim 16, wherein the first, second, and third coils are embedded on an antenna substrate that is metal-free.

20. The smart card of claim 19, wherein the antenna substrate is disposed between a plurality of card substrate layers.

\* \* \* \* \*